H. C. STALEY
PROCESS OF CURING OLIVES.
APPLICATION FILED FEB. 12, 1917.
1,265,130.
Patented May 7, 1918.
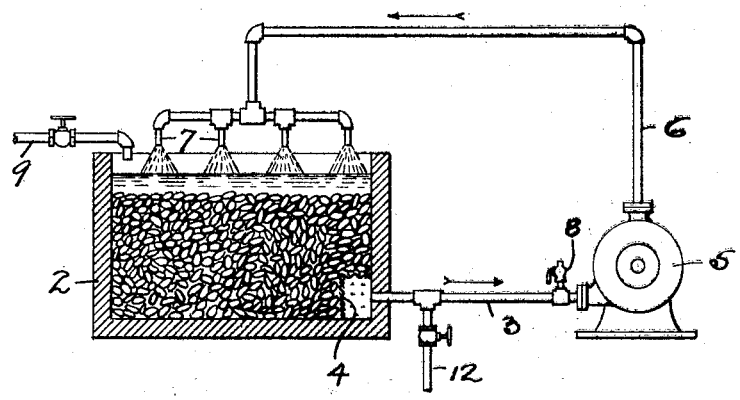
WITNESS
J. B. Gardner
INVENTOR.
H. C. STALEY
BY White & Prost
HIS ATTORNEYS

UNITED STATES PATENT OFFICE.

HOMER C. STALEY, OF HAYWARD, CALIFORNIA, ASSIGNOR TO HUNT BROTHERS COMPANY, OF SAN FRANCISCO, CALIFORNIA, A CORPORATION OF CALIFORNIA.

PROCESS OF CURING OLIVES.

1,265,130.     Specification of Letters Patent.     Patented May 7, 1918.

Application filed February 12, 1917. Serial No. 148,276.

*To all whom it may concern:*

Be it known that I, HOMER C. STALEY, a citizen of the United States, and a resident of Hayward, Alameda county, State of California, have invented a certain new and useful Process of Curing Olives, of which the following is a specification.

The invention relates to a process of curing olives.

An object of the invention is to provide a process of curing olives which greatly reduces the time required for effecting the desired result.

Another object of the invention is to provide a curing process which produces an olive of improved taste and quality.

The invention possesses other advantageous features, some of which, with the foregoing, will be set forth at length in the following description where I shall outline in full the process and one form of apparatus for carrying out the process. It is to be understood, however, that modifications in the process and apparatus may be made within the scope of the appended claims.

Heretofore, olives have been cured by treating them with a lye solution and then exposing the olives to the air to oxidize the lye or by exposing them to running water, the dissolved air in the water serving to oxidize the lye. Either of these processes require several weeks' exposure to air or running water to properly cure the olives and further, the air exposure often resulted in burned olives of poor quality. In accordance with my process, the olives after being removed from the lye bath are cured within from three to six days, depending upon the quality and condition of the olives, thereby effecting a saving of from 20 to 25 days in curing the olives, and thereby practically trebling the capacity of any given curing plant.

In accordance with my process, I subject the olives after they have been removed from the lye tank to water which is thoroughly charged and saturated with air in very fine particles, so that it has a milky appearance. This thoroughly charged aerated water is circulated and re-circulated through the tank containing the olives, so that all of the olives are continuously supplied with an excess of oxygen. The highly charged water is preferably introduced into the tank at the top and is withdrawn from the bottom, is further aerated and is again forced back into the tank, thereby providing for a continuous circulation of the aerated liquid through the olives. I have tried forcing air in small jets into the bottom of the olive tank, but air so introduced, breaks up into small bubbles and rises through the water, contacting with only a portion of the olives and results in poor and improper curing, but with the continuous circulation of aerated liquid as in the present process I not only produce a perfect, cured olive, but accomplish the result in much less time than has heretofore been considered necessary. The air in the charged liquid is broken up into extremely fine particles, so that the liquid has a milky appearance and the air remains in suspension in the liquid, so that olives at all parts of the tank are subjected to the air. The liquid withdrawn from the bottom of the tank carries more or less air in suspension and this amount is increased before the liquid is again forced into the tank. The water may be changed occasionally during the process to remove from the curing bath any undesirable components. After being cured, the olives are placed in the usual salt solution.

In the accompanying drawing I have shown one form of apparatus for carrying out the process of my invention. The olives are placed in a suitable tank 2 in which they are subjected to the action of the circulating, continuously aerated, liquid. Connected to the tank 2 at the bottom is a pump suction pipe 3, the intake end of which is protected by a screen 4. The suction pipe is connected to the pump 5, which is of the rotary or gear type or other type which will not lose priming when it draws air, and the liquid from the pump is forced through the discharge pipe 6 and either in the form of jets through the nozzles 7 into the tank or through pipes which extend below the surface of the liquid in the tank. The amount of liquid used is preferably sufficient to submerge the top layer of olives a sufficient distance so that the jets will not strike them directly. Arranged in the suction pipe 3 adjacent the pump is a cock 8 or other device through which air may be drawn into the suction pipe. This air is broken up into very fine particles in passing through the pump and is thoroughly disseminated throughout the liquid, so that the discharging liquid is thoroughly aerated and saturated with air particles carried in suspension. The saturated liquid descends through the mass of olives and is withdrawn from the bottom of the tank and again charged with air before being re-introduced. Liquid is initially introduced into the tank through the pipe 9 and may be withdrawn from the system through the pipe 12, when desired.

I claim:

1. The process of curing olives which consists in subjecting the olives to a lye bath and subsequently subjecting the olives to a bath of continuously artificially aerated circulating liquid.

2. The process of curing olives which consists in subjecting the olives to a lye bath and subsequently subjecting the olives to a bath of moving liquid carrying minute particles of air in suspension.

3. The process of curing olives which consists in subjecting the olives to a lye bath and subsequently subjecting the olives in a tank to a liquid carrying minute particles of air in suspension, continuously withdrawing the liquid from the bottom of the tank, continuously adding air to said withdrawn liquid and intimately mixing said air and liquid, and forcing the mixture back into the tank.

4. The process of curing olives which consists in subjecting the olives to a lye bath and subsequently subjecting the olives in a tank to a moving stream of continuously artificially aerated and re-circulated liquid carrying minute particles of air in suspension.

5. The process of pickling olives comprising aerating a liquid and passing the liquid over and between the olives after they have been subjected to a lye solution.

In testimony whereof, I have hereunto set my hand at Hayward, California, this 3d day of February, 1917.

HOMER C. STALEY.

In presence of—
ARTHUR E. MANTER,
W. H. MEEK.

Copies of this patent may be obtained for five cents each, by addressing the "Commissioner of Patents, Washington, D. C."